May 13, 1924. 1,494,182
R. J. NETZEL ET AL
PORTABLE HAND OPERATED ROTARY CUTTING DEVICE
Filed Sept. 3, 1921 2 Sheets-Sheet 1
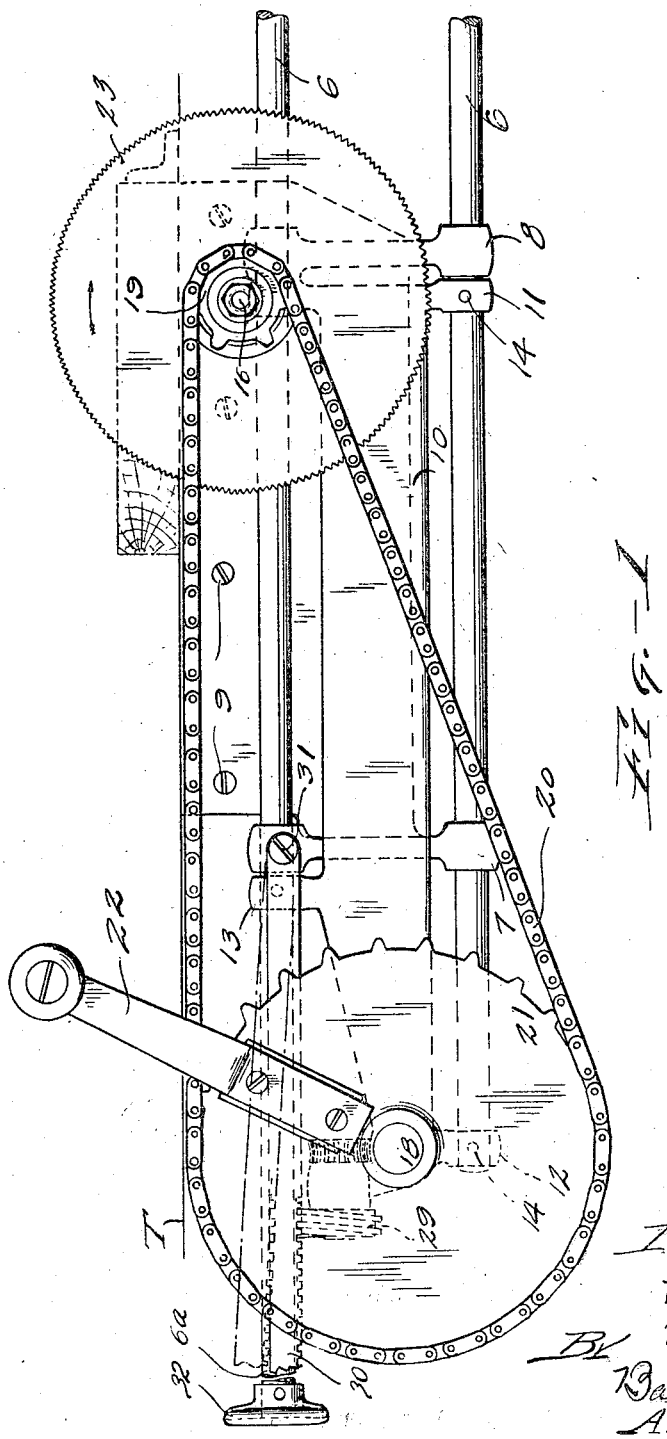

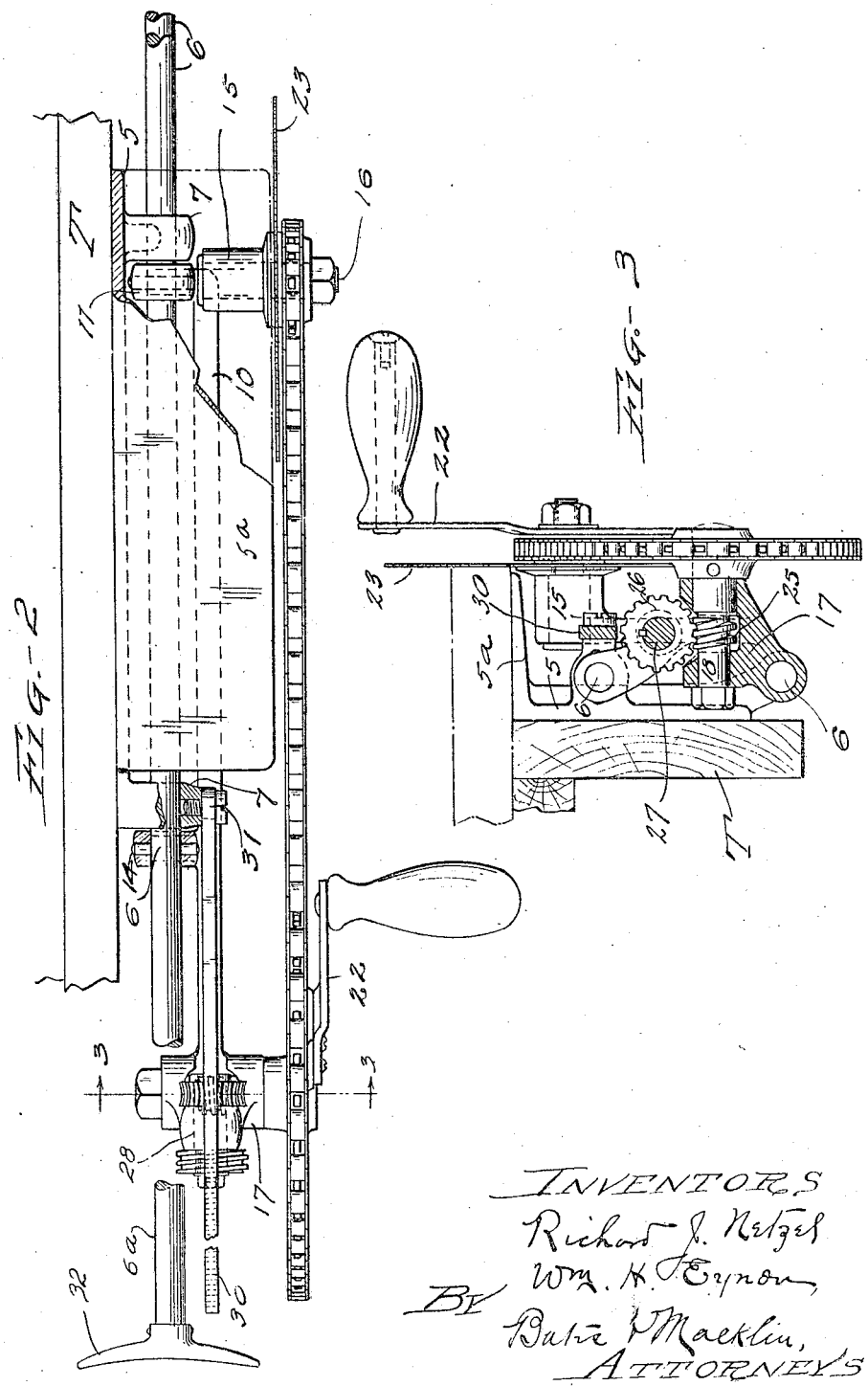

Patented May 13, 1924.

1,494,182

UNITED STATES PATENT OFFICE.

RICHARD J. NETZEL, OF LAKEWOOD, AND WILLIAM H. EYNON, OF CLEVELAND, OHIO.

PORTABLE HAND-OPERATED ROTARY CUTTING DEVICE.

Application filed September 3, 1921. Serial No. 498,363.

*To all whom it may concern:*

Be it known that we, RICHARD J. NETZEL and WILLIAM H. EYNON, citizens of the United States, residing at Lakewood, Ohio, and Cleveland, Ohio, respectively, in the county of Cuyahoga and State of Ohio, have invented a certain new and useful Improvement in Portable Hand-Operated Rotary Cutting Devices, of which the following is a full, clear, and exact description, reference being had to the accompanying drawings.

The general object of our invention is the provision of a portable hand power cutting device which may be readily attached to a table, work bench, or like support with the cutting edge of a rotary knife or saw projecting above the support, whereby the material to be cut may be placed upon the support and the saw or knife propelled therethrough while being manually driven.

A more specific object is the provision of automatic feed mechanism in such a portable hand power cutting device which may uniformly advance the rotating cutter a certain amount per each revolution thereof.

A further object is to provide a portable tool wherein the foregoing features may be embodied in a very light yet durable and simple construction.

Other objects will become apparent from the following description relating to the accompanying drawings which illustrate a preferred embodiment of our invention. The essential characteristics are summarized in the claims.

In the drawings Fig. 1 is a side elevation of our device when secured to the end of a work bench; Fig. 2 is a plan view of the device with various portions shown in cross section; while Fig. 3 is an end cross sectional elevation substantially along the line 3—3 of Fig. 2.

A preferred embodiment of our invention consists of a supporting frame, serving as a guide for a slidable carrier frame, on which the cutter and manually driving mechanism is mounted. At 5 is shown the body member of the supporting frame having integral bearing lugs 7 embracing a pair of parallel side rods 6. The body member may have a reinforcing flange 5ª the top surface of which may serve as a continuation of the table supporting surface upon which the material is placed. This body member or support may be of sufficient length to provide a considerable distance between integral bearing lugs 7 and 8 formed at the ends thereof. These end lugs may have properly spaced apertures formed therein which afford suitable slide bearings for the parallel slide members 6. The body member 5 may be secured to the table by any suitable means such as screws 9.

The movable carrier may be comprised of a slide frame 10 having integral lugs 11, 12 and 13 off-set from the body portion to permit alignment of apertures adapted to receive the rods 6. Hence the slide members or rods 6 may pass through all of the lug apertures and the slide frame 10 may be rigidly attached to the slide members 6 by suitable pins 14, which are passed through the slide frame lugs.

A cutter shaft 16 is mounted in a suitable bearing 15 formed at the end of the slide frame, and another bearing support 17 formed at the other end may constitute a support for a sprocket shaft 18. The saw shaft bearing 15 is shown positioned high enough on the slide frame 10 so that a considerable portion of a circular saw (or cutter) 23 may extend above the flange 5ª of the support 5. A sprocket pinion 19 rigid with the saw shaft 16 may be of such size that a driving chain 20 will not extend above the top surface of the support member 5. A suitable hand crank 22 may be removably secured, as shown, to the side of the sprocket 21.

The diameter of the sprocket pinion 19 may be much smaller in diameter than the driving sprocket 21, hence one rotation of the hand crank 22 will rotate the cutter 23 several times. The linear velocity of the cutting edges may be varied by mounting cutters of different diameters on the device. Due to the fact that the cutting edge of the tool is likely to be forced beyond its cutting capacity, we have provided means in this invention for advancing the rotary cutting blade into the work a pre-determined amount for each revolution thereof. In other words, we have incorporated a saw feeding mechanism which is geared positively to the saw driving mechanism.

This feed mechanism may be comprised of a worm 25 formed on the sprocket shaft 18 which may engage a small worm wheel 26 carried on a stud 27, supported by a bearing 28 formed at the top and integral with the bearing 17. On this stud is shown a suitable feed worm 29 secured to the outer end thereof, so positioned that it may engage a rack 30 connected to one of the slide bearing lugs 7 as shown at 31. This rack arm may be pivoted to allow it to be raised and lowered as indicated by the dot and dash lines in Fig. 1. By raising the rack arm 30 out of engagement with the feed worm 29 the slide frame 10 may be manually reciprocated.

As shown, we have arranged the feed gear and sprocket ratios in such proportions that one rotation of the hand crank 22 will impart several rotations to the saw 23 and also impart a positive advance to the saw disc transversely of its axis a distance of a small fraction of an inch to each rotation of the disc. These results may be varied as for sawing wood or like materials. To cut other materials, such for example as rubber fabric, a different cutting disc may be used having a knife edge which, when lubricated with a suitable cutting liquid, can be fed into the material with considerable speed. Different cutting conditions can be obtained by using discs of different diameters as well as discs with different cutting edges. In any case, the linear velocity of the cutting disc bears a direct relation to the feed per revolution of the hand crank 22, when a constant force is exerted on the crank. A new range of feeds and linear velocities may be obtained by the use of a feed worm having a different pitch than the pitch illustrated on the worm 29.

It is frequently desirable that the cutter be fed either slower or faster in relation to its rotation than the feed gears provide. We have, therefore, shown a push pad 32 which may be secured to an extension 6ª, of one of the parallel slide members 6. As the device is usually secured to the end of a work table, the position of this push pad may be such that the saw can be progressed, as the material is being cut, by the operator pressing the body against the push pad while he rotates the crank with one hand and holds the work with the other.

From the foregoing description of our invention it is apparent that the device may be economically constructed without detracting from the durability thereof. The construction is such that rotary cutting tools may be readily mounted and dismounted on a movable member which may be automatically or manually moved as the cutting tool is rotated; the automatic feed mechanism being such that it may be quickly disengaged, thus permitting unobstructed movement of the cutter carrier.

It is also evident that we have provided a portable hand power rotary cutter with automatic feed mechanism, thus giving the device characteristics of efficiency and advantages of operation which heretofore have only been found in the class of cutting machines which are large and comparatively stationary.

Having thus described our invention, we claim:

1. The combination with a work bench having a top, of a support adapted to be rigidly secured to the bench and having a flat top surface adapted to align with the top surface of the bench, a frame slidably mounted on said support, a rotary cutter carried by the frame beyond the edge of the portion of the support which aligns with the top of the bench so as to project above the top of the flange, and manually operable means for operating the cutter.

2. In combination, a work bench having a top, of a support rigidly connected to the bench and having a flange projecting laterally to form a continuation of the top, a frame slidably mounted within said support and beneath the flange, a rotary cutter carried by the frame beyond the edge of the flange so as to project above the top of the flange, and manually operable means beneath said flange and mounted on the frame for operating the cutter.

3. In combination, a support having a side and top, a frame secured to the side and having a flange forming a continuation of the top, an auxiliary frame slidable on the first frame and beneath the flange, a rotary cutter on the auxiliary frame carried so as to project above the top of the flange, a sprocket wheel mounted on the auxiliary frame and operatively connected to the cutter, said wheel being disposed beneath the flange and outside the extremity thereof, and co-operating means on said frame for advancing the cutter into the work when the wheel is rotated, said means being also disposed beneath the flange and being acted upon by gravity for normally causing the feeding operation.

4. In combination, a support having a side and top, a frame secured to the side and having an overhanging flange arranged to form an extension of the top, a carriage on the frame and beneath the flange, a rotary cutter on the carriage adapted to project above the top of the flange, means for operating the cutter, and mechanism associated with said means for advancing the cutter, said mechanism and means being disposed beneath the flange.

5. In a device of the character described, the combination of a rotatable cutter, a support adapted to be attached to a work table, a carriage mounted on said support member and carrying said cutter, and means for feeding the cutter a pre-determined distance in a direction transversely of its axis for each revolution thereof, said means including a feed worm carried by the frame member and a rack pivotally mounted on said support whereby the rack may be disengaged from said worm and thereby permit a free movement of the cutter during the cutting operation.

6. In a device of the character described, the combination of a support frame comprised of a body member having projecting portions constituting bearings formed integrally at the ends thereof and having an overhanging flange portion comprising a work supporting table and a movable frame slidably mounted in said bearings, a circular cutter rotatably mounted on the slidable frame so as to project above the top of the flange and manually operated means carried by the frame for rotating the cutter, said bearing being beneath the overhanging portion, and said cutter and operating means therefor being outside the overhanging portion.

7. In a device of the character described, the combination of a support frame adapted to be secured to a work bench, a second frame having a pair of parallel bars rigid therewith and slidably engaging the first frame, a cutter rotatably mounted on the last named frame, manually operated means for rotating the cutter and means for moving said slidable frame relative to the support frame a predetermined amount per each revolution of the cutter, said means including a reduction worm and gear adapted to drive a feed worm and a rack bar pivotally mounted on said support frame, said rack bar being normally urged by gravity into engagement with said worm.

In testimony whereof, we hereunto affix our signatures.

RICHARD J. NETZEL.
WILLIAM H. EYNON.